(12) United States Patent
Brisson et al.

(10) Patent No.: US 9,541,574 B2
(45) Date of Patent: Jan. 10, 2017

(54) SENSOR WITH ELECTROSTATIC PENDULAR ACCELEROMETER AND METHOD OF CONTROLLING SUCH A SENSOR

(71) Applicant: SAFRAN ELECTRONICS & DEFENSE, Boulogne Billancourt (FR)

(72) Inventors: Raphael Brisson, Boulogne Billancourt (FR); Vincent Ragot, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 14/768,415

(22) PCT Filed: Feb. 11, 2014

(86) PCT No.: PCT/EP2014/052652
§ 371 (c)(1),
(2) Date: Aug. 17, 2015

(87) PCT Pub. No.: WO2014/128027
PCT Pub. Date: Aug. 28, 2014

(65) Prior Publication Data
US 2016/0003865 A1  Jan. 7, 2016

(30) Foreign Application Priority Data
Feb. 19, 2013 (FR) ..................... 13 00361

(51) Int. Cl.
*G01P 15/125* (2006.01)
*G01P 15/13* (2006.01)
(Continued)

(52) U.S. Cl.
CPC ......... *G01P 15/125* (2013.01); *G01P 15/0802* (2013.01); *G01P 15/131* (2013.01); *G01P 15/18* (2013.01); *G01P 2015/0828* (2013.01)

(58) Field of Classification Search
CPC ......... G01P 15/125; G01P 15/18; G01P 15/08; G01P 15/131; G01P 15/124; G01P 15/133
(Continued)

(56) References Cited

U.S. PATENT DOCUMENTS 4,345,474 A * 8/1982 Deval ................... G01P 15/131
73/514.18
4,803,883 A * 2/1989 Shutt ..................... G01P 15/133
73/514.21
(Continued)

FOREIGN PATENT DOCUMENTS

WO    WO 2010/046368 A1    4/2010

*Primary Examiner* — Helen Kwok
(74) *Attorney, Agent, or Firm* — Muncy, Geissler, Olds & Lowe, P.C.

(57) ABSTRACT

An accelerometer sensor and method of controlling the sensor, the accelerometer sensor including at least one electrostatic pendular accelerometer having stationary first and second electrodes fastened to a housing and connected to an exciter circuit, and a third electrode carried by a pendulum connected to the housing, thereby being movable and being connected to a detector circuit. The exciter circuit has an output connected to a switch connected to the first and second electrodes, the switch having a first connection position and a second connection position for selectively connecting the first or second electrode to the exciter circuit. The detector circuit, the exciter circuit, the switch, and the detector circuit are connected to a control circuit arranged so the first and second electrodes are excited by pulse trains, thus keeping the pendulum in a setpoint position and determining an acceleration to which the pendulum is subjected.

14 Claims, 2 Drawing Sheets

(51) Int. Cl.
*G01P 15/08* (2006.01)
*G01P 15/18* (2013.01)

(58) Field of Classification Search
USPC .............. 73/514.17, 514.28, 514.32, 514.36,
73/514.38, 514.21
See application file for complete search history.

(56) References Cited

U.S. PATENT DOCUMENTS

| | | | | |
|---|---|---|---|---|
| 5,054,320 | A | * | 10/1991 | Yvon .................... G01P 15/131 73/514.18 |
| 5,095,750 | A | * | 3/1992 | Suzuki .................. G01P 15/131 73/514.18 |
| 5,417,312 | A | * | 5/1995 | Tsuchitani .............. G01P 1/003 188/181 A |
| 5,440,939 | A | * | 8/1995 | Barny .................... G01D 3/066 73/514.18 |
| 5,473,946 | A | * | 12/1995 | Wyse .................... G01P 15/131 73/514.18 |
| 5,812,427 | A | | 9/1998 | Nonoyama et al. |
| 6,257,061 | B1 | * | 7/2001 | Nonoyama ........... G01P 15/125 324/661 |
| 6,301,965 | B1 | | 10/2001 | Chu et al. |
| 2008/0295597 | A1 | | 12/2008 | Stewart et al. |
| 2014/0165691 | A1 | * | 6/2014 | Stewart .................. G01P 21/00 73/1.38 |

* cited by examiner

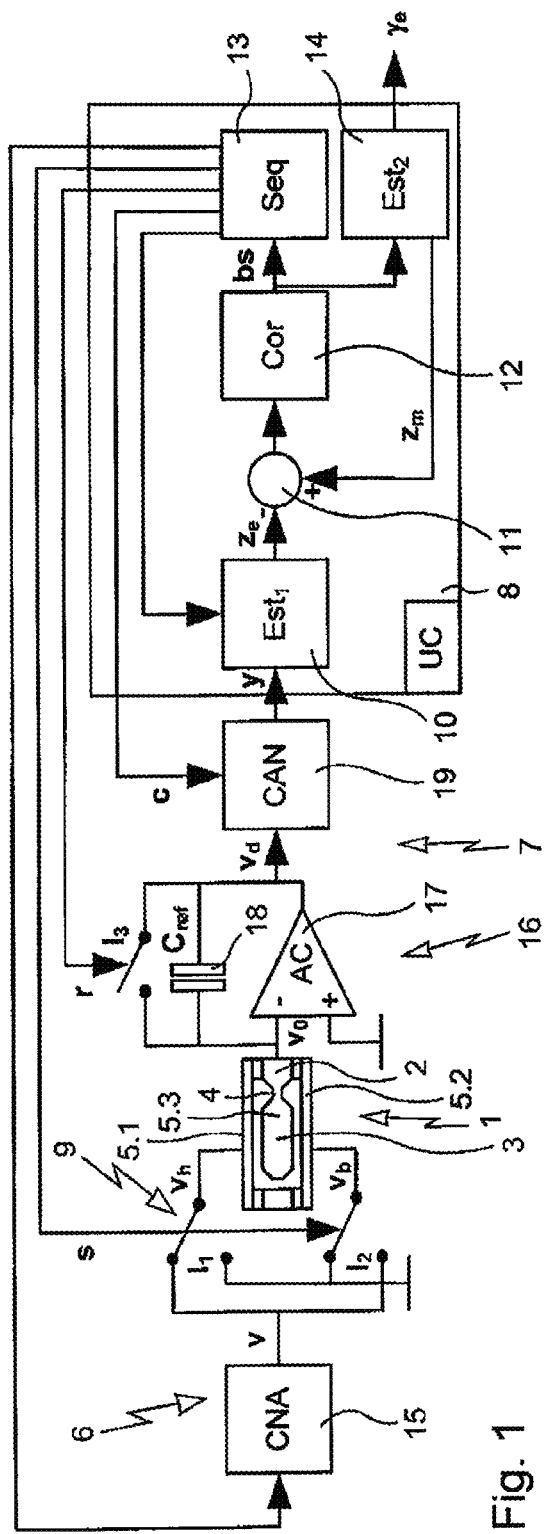
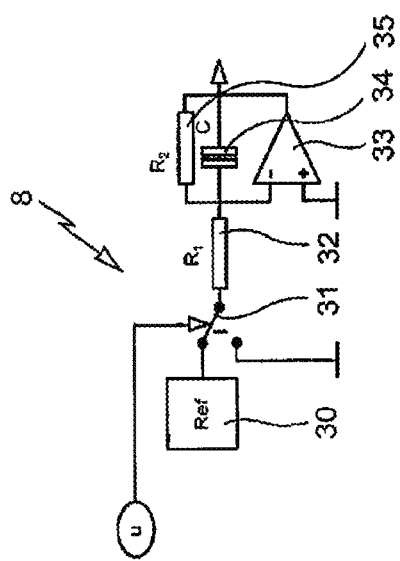
Fig. 1
Fig. 2

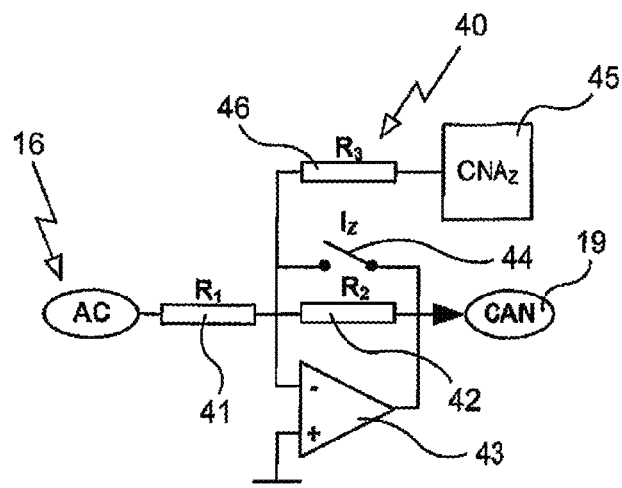
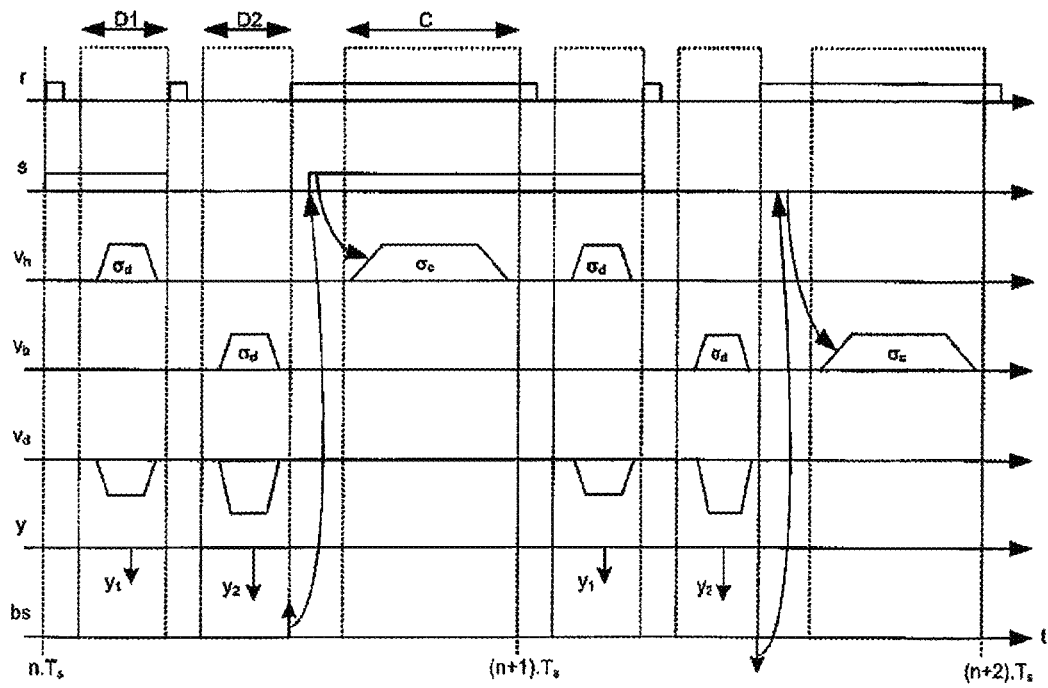
Fig. 3
Fig. 4

SENSOR WITH ELECTROSTATIC PENDULAR ACCELEROMETER AND METHOD OF CONTROLLING SUCH A SENSOR

BACKGROUND OF THE INVENTION

The present invention relates to an electrostatic pendular accelerometer sensor and to a method of controlling such a sensor. By way of example, the sensor may be a sensor of the micro electromechanical system (MEMS) type.

An electrostatic pendular accelerometer comprises a housing having a seismic mass connected thereto via one or more hinges positioned in such a manner that the seismic mass forms a pendulum that is movable relative to the housing either in translation or in rotation. The movements of the seismic mass under the effect of acceleration are generally detected by means of three electrodes. Stationary first and second electrodes are secured to the housing and connected to an exciter circuit. The third electrode is movable and is carried by the pendulum, being connected to a detector circuit.

Each stationary electrode co-operates with the movable electrode to form a capacitor of capacitance that depends on the spacing between them. In the absence of any manufacturing defects and when the sensor is not being subjected to acceleration along its sensing axis, the pendulum remains in a neutral position in which the two capacitances are equal. In contrast, when the pendulum is subjected to an acceleration along its sensing axis, it moves, thereby decreasing the capacitance formed by the movable electrode and one of the stationary electrodes, and increasing the capacitance formed by the movable electrode and the other stationary electrode. This variation in capacitances also depends on the deformations of the housing and of the pendulum.

In open-loop operation, the acceleration applied along the sensing axis of the sensor is deduced from the difference that exists between the two capacitances. This mode of operation nevertheless presents several drawbacks:
  the direction of the sensing axis varies depending on the position of the pendulum when the pendulum is movable in pivoting;
  there is an offset due to asymmetries in fabrication of the capacitors (electrodes of different areas and/or different gaps between the electrodes);
  measurement non-linearities exist because of the way the capacitances are non-linear as a function of the movement of the electrodes;
  during movements of the pendulum, the gas surrounding the pendulum compresses and expands, thereby generating forces on the pendulum;
  passband is narrow because of the resonant frequency of the pendulum.

In closed-loop operation, the position of the pendulum is servo-controlled to a neutral position or to a setpoint position, halfway between the stationary electrodes, by applying an electrostatic force to the pendulum. The electrostatic force must therefore compensate the acceleration that is applied along the sensing axis, thereby enabling the acceleration to be estimated. The electrostatic force is the result of voltages applied to the electrodes in order to keep the difference between the capacitances at zero.

The sensor has an exciter circuit for each stationary electrode that is arranged to power the electrodes so as to generate said electrostatic force.

The root means square (rms) nature of the electrostatic force relative to the applied voltages complicates the design of the control circuit serving to servo-control the pendulum and estimate acceleration. In order to work around this difficulty, it is known to apply on/off control to the pendulum using calibrated voltage pulses. The pulses are applied to one or other of the electrodes depending on whether the pendulum is to be pulled or pushed in order to be returned towards its setpoint position. The density of the pulses for pushing (or pulling) the pendulum, i.e. the number of pulses over a time interval, is then an affined function of the acceleration that is to be measured. Thus, zero acceleration is compensated by equal numbers, on average, of pulses in both directions.

Nevertheless, if the symmetry of the pulses applied to the two electrodes is imperfect (mainly because of a difference between the durations of the pulses applied respectively to the first and second stationary electrodes), the pulse density is modified by the servo-control in order to maintain the pendulum in the setpoint position, thereby biasing the estimate of the acceleration. By way of example, taking an accelerometer in which each of the voltages applied during the control stage exerts a mean force for a duration $T_s=1$ microsecond (µs), equivalent to an acceleration of the pendulum of 50 g, in order to maintain the bias of such an accelerometer to a value of less than 50 µg, it is necessary for the symmetry of the pulses to be controlled with an error less than the ratio 50 µg/50 g, i.e. less than $1\times10^{-6}$. It is therefore necessary to control the duration of the pulses applied to each of the electrodes in such a manner that the asymmetry does not exceed $1\times10^{-6}\times1$ µs, 1 picosecond (µs), which is extremely difficult.

Asymmetries of implementation, which constitute the weak point of on/off control, are thus a major obstacle in obtaining better performance from such sensors.

BRIEF SUMMARY OF THE INVENTION

An object of the invention is to provide means enabling the performance of such sensors to be imposed.

To this end, according to the invention, there is provided an accelerometer sensor comprising at least one electrostatic pendular accelerometer having stationary first and second electrodes that are fastened to a housing and that are connected to an exciter circuit, and a third electrode that is carried by a pendulum connected to the housing so as to be movable and that is connected to a detector circuit. The exciter circuit has an output connected to a switch connected to the first and second electrodes, the switch having a first connection position and a second connection position for selectively connecting the first electrode or the second electrode to the exciter circuit, and the exciter circuit, the switch, and the detector circuit are connected to a control circuit arranged so that the first and second electrodes are excited by pulses in such a manner as to keep the pendulum in a setpoint position and in such a manner as to determine an acceleration to which the pendulum is subjected.

Thus, the pulses are delivered to each electrode by the same exciter circuit, thereby limiting problems associated with fabrication asymmetries and aging of the electronics of the exciter circuit.

The invention also provides a method of controlling a sensor comprising at least one electrostatic pendular accelerometer having stationary first and second electrodes that are secured to a housing and that are connected to an exciter circuit, and a third electrode that is carried by a pendulum connected to the housing so as to be movable and that is connected to a detector circuit. The control method comprises the steps of:

exciting in alternation first one and then the other of the stationary electrodes by detection pulses in order to detect a first capacitance and a second capacitance between the movable electrode and the respective stationary electrodes;

estimating a position of the pendulum from the detected capacitances;

determining a servo-control error corresponding to a difference between the estimated position and a setpoint position;

on the basis of the servo-control error, determining a command specifying whether the next detection pulse is to push or to pull the pendulum;

calculating the acceleration that is to be measured as a function of the setpoint position and of the determined command; and during a control stage, exciting one or the other of the stationary electrodes by control pulses for servo-controlling the servo-controlled error to zero.

Other characteristics and advantages of the invention appear on reading the following description of particular, non-limiting embodiments of the invention.

BRIEF DESCRIPTION OF THE SEVERAL VIEWS OF THE DRAWINGS

Reference is made to the accompanying drawings, in which:

FIG. 1 is a diagrammatic view of a sensor in a first embodiment of the invention;

FIG. 2 is a fragmentary diagrammatic view of a sensor in a second embodiment;

FIG. 3 is a view analogous to FIG. 2 showing a sensor in a third embodiment; and FIG. 4 is a timing diagram showing how the sensor is controlled.

DETAILED DESCRIPTION OF THE INVENTION

With reference to the figures, the accelerometer sensor of the invention comprises an electrostatic pendular accelerometer given overall reference 1. The accelerometer 1 comprises a housing 2 that is connected to a seismic mass 3 that is connected to the housing 2 by a hinge 4 positioned in such a manner that the seismic mass 3 forms a pendulum that is movable relative to the housing 2 with pivoting movements.

The accelerometer 1 comprises a stationary first electrode 5.1 and a stationary secondary electrode 5.2 that are secured to the housing 2 and that are connected to an exciter circuit given overall reference 6, and a third electrode 5.3 constituting the seismic mass 3 and connected to a detector circuit given overall reference 7. A control circuit given overall reference 8 is connected to the exciter circuit 6 and to the detector circuit 7 in order to control them.

The exciter circuit 6 has an output connected to a switch 9 that is connected to the first electrode 5.1 and to the second electrode 5.2. The switch 9 has a first connection position and a second connection position for connecting the first electrode 5.1 and the second electrode 5.2 selectively to the exciter circuit 6. More precisely, the switch 9 has a selector $I_1$ arranged to connect the first electrode 5.1 either to the output of the exciter circuit 6 (first connection position) or else to ground (second connection position), and a selector $I_2$ arranged to connect the second electrode 5.2 either to the output of the exciter circuit 6 (second connection position) or else to ground (first connection position). The switch 9 is connected to the control circuit 8 in order to be controlled thereby.

The control circuit 8 has a first estimator 10 with an input connected to the detector circuit 7 and an output connected to a negative input of a summing circuit 11 having an output connected to an input of a corrector 12 having an output connected to a sequencer 13. The control circuit 8 also has a second estimator 14 having an input connected to the output of the corrector 12, an output connected to the additive input of the summing circuit 11, and an output supplying the acceleration estimate $\gamma_e$.

In the first embodiment shown in FIG. 1, the exciter circuit 6 has a digital-to-analog converter 15 connected to the switch 9 and controlled by the control circuit 8.

The detector circuit 7 has a main amplifier stage 16 comprising a load amplifier 17 provided with a feedback capacitor 18 of capacitance $C_{ref}$ and a selector $I_3$. The amplifier stage has an input connected to the third electrode 5.3 and an output connected to an input of an analog-to-digital converter 19 having an output connected to the first estimator 10 of the control unit 8.

The operation of the sensor is described below.

The control unit 8 manages the operation of the sensor and in particular the timing of the various operations that are sampled at a frequency $F_s$ (with period $T_s=1/F_s$, see FIG. 4). The sequencer 13 sequences the operations within the sampling period $T_s$ and from one sampling period (n) $T_s$ to the next $(n+1)T_s$. The sequencer 13 of the control unit 8 controls the digital-to-analog converter 15 sequentially and cyclically by means of a command u, controls the analog selectors $I_1$, $I_2$ by means of a command s, and controls the analog-to-digital converter 19 by means of a command c and the analogous selector $I_3$ by means of a command r.

Depending on the logic state of the command s, one of the electrodes 5.1, 5.2 is connected to the output v of the digital-to-analog converter 15, while the other electrode 5.2, 5.1 is simultaneously connected to ground. It should be observed that the sequencer 13 is arranged to cause this switching to take place while the output v is at zero in order to avoid transient disturbances during switching.

The voltages $v_h$ and $v_b$ that are applied respectively to the electrodes 5.1 and 5.2 are sequenced so as to measure the capacitances $C_h$ (capacitance formed between the electrodes 5.1 and 5.3), and $C_b$ (capacitance formed between the electrodes 5.2 and 5.3) in order to apply the electrostatic force that serves to servo-control the pendulum to its setpoint position as imposed by the control unit. Assuming that the initial speed of the pendulum is zero, the duration $T_i$ of each pulse applied to each of the electrodes 5.1, 5.2 is selected to be short enough to ensure that the movement z caused by said pulse at the end of the duration $T_s$ remains small compared with the gap e existing between said stationary electrode 5.1, 5.2 and the movable electrode 5.3.

The selector $I_3$ that loops the load amplifier 17 is controlled by the signal r coming from the sequencer 13 and, by feedback, serves to cause the load amplifier 17 to maintain the potential $v_0$ at the electrode 5.3 constant, e.g. at zero as in the diagram.

The output voltage $v_d$ from the load amplifier 17 is converted into a digital magnitude y by the analog-to-digital converter 19 under the control of the command s.

The estimator 10 supplies the estimate $z_e$ of the movement of the pendulum on the bias of the magnitude y.

The estimator 14 supplies the additive input of the summing circuit 11 with a disturbance $z_m$ that is determined in known manner to excite and estimate certain error terms so that their effects can be compensated, as described below.

The summing circuit determines the difference $z_m-z_e$, which difference is forwarded to the corrector 12 that prepares a command bs of value +1 or −1 depending on whether it is appropriate to push or to pull the pendulum so as to return the input of the corrector 12 to zero. Thus, the corrector 12 serves to servo-control the difference $z_m-z_e$ to zero.

The estimator 14 also determines an estimate $\gamma_e$ of the acceleration that is to be measured.

In the method of the invention, each sampling period $T_s$ comprises three main stages, namely:
- a first detection stage $D_1$ in which the voltage $V_d$ is detected for the pair of electrodes 5.1 and 5.3, and converted into a magnitude $y_1$;
- a second detection stage $D_2$ in which the voltage $V_d$ is detected for the pair of electrodes 5.2 and 5.3, and converted into a magnitude $y_2$; and
- a control stage C in which an excitation signal is applied either to the stationary electrode 5.1 (in this example $n \cdot T_s$) or to the stationary electrode 5.2 (in this example $(n+1) \cdot T_s$) depending on whether it is necessary to attract the seismic mass either towards the stationary electrode 5.1 or towards the stationary electrode 5.2 in order to return it to its setpoint position.

At the end of the two detection stages, the corrector 12 determines the sign of the command bs that determines whether the control signal u should be applied to the stationary electrode 5.1 or to the stationary electrode 5.2.

The three stages $D_1$, $D_2$, and C are separated by a relaxation stage during which the selectors $I_1$, $I_2$, and $I_3$ are prepositioned while the voltages of the converters are zero.

The detection stages followed by the control stages are described below in detail.

During the detection stage $D_1$ for measuring $C_h$, the logic command s is at 1 so that the stationary electrode 5.1 is connected by the selector $I_2$ to the output v of the digital-to-analog converter 15 and the stationary electrode 5.2 is connected to ground by the selector $I_2$.

The looping capacitance of the load amplifier is previously short-circuited by the selector $I_3$ (r=1, re-initializing the load amplifier), whereas the output from the digital-to-analog converter 15 is at zero.

After r has returned to zero, the potential $v_h$ is taken by the action of the digital-to-analog converter 15 to a constant value $V_{ref}$, thereby transferring a quantity of charge $C_h \cdot V_{ref}$ into the capacitor $C_{ref}$.

When the output from the load amplifier 17 has stabilized, a first analog-to-digital conversion of $v_d$ is performed. Using the notation $Q_{os}$ for the quantity of charge that is injected on being opened by the analog selector $I_3$ associated with the capacitor $C_{ref}$, $v_{os}$ for the offset brought to the input of the digital-to-analog converter 15, and $G_{adc}$ for the gain of the analog-to-digital converter 19, the output from the analog-to-digital converter 19 at the end of the stage $D_1$ can be written:

$$y_1 = G_{adc}\left(\frac{C_h \cdot V_{ref} + Q_{os}}{C_{ref}} + v_{os}\right)$$

The stage $D_2$ for measuring $C_b$ is identical to the stage $D_1$ except that the roles of the electrodes 5.1 and 5.2 are interchanged by the fact that s is at 0 and no longer at 1. This leads to a second value being coded by the analog-to-digital converter 19 at the end of the stage $D_2$, as given by:

$$y_2 = G_{adc}\left(\frac{C_b \cdot V_{ref} + Q_{os}}{C_{ref}} + v_{os}\right)$$

It is by using a single digital-to-analog converter 15 associated with the selectors $I_2$ and $I_2$ that it is ensured that the value of $V_{ref}$ is identical in the expressions for the values $y_1$ and $y_2$.

The operation performed by the estimator 10 consists in calculating the difference between $y_1$ and $y_2$ and then in multiplying the result by the gain $G_{comp}$:

$$z_e = G_{comp} \cdot (y_2 - y_1) = G_{comp} \cdot G_{adc} \cdot \frac{C_h - C_b}{C_{ref}} \cdot V_{ref}$$

$$G_{comp} = \left(2 \cdot G_{adc} \cdot \frac{C_1}{C_{ref}} \cdot \frac{V_{ref}}{e}\right)^{-1}$$

The biases of electronic origin ($Q_{os}$ and $v_{os}$) are eliminated, and furthermore using a single analog-to-digital converter 19 gives the same weight to the measurements of $C_h$ and $C_b$, thereby eliminating another source of bias.

It should be observed that by replacing the capacitances by their expressions as a function of z in the above expression for $z_e$, it can be seen that asymmetries of the electrodes are responsible for an estimate bias $z_0$:

$$z_e = \left(2 \cdot \frac{C_1}{e}\right)^{-1} \cdot \left[\sum_{i=0}^{+\infty}(1+\varepsilon_i) \cdot C_i \cdot \left(\frac{z}{e}\right)^i - (1-\varepsilon_i) \cdot C_i \cdot \left(-\frac{z}{e}\right)^i\right]$$

$$\approx e \cdot \left[\varepsilon_0 \cdot \frac{C_0}{C_1} + \frac{z}{e} + \varepsilon_2 \cdot \frac{C_2}{C_1} \cdot \left(\frac{z}{e}\right)^2 + \frac{C_3}{C_1} \cdot \left(\frac{z}{e}\right)^3 + \varepsilon_4 \cdot \frac{C_4}{C_1} \cdot \left(\frac{z}{e}\right)^4\right]$$

$$\approx \underbrace{e_0 \cdot \frac{C_0}{C_1} \cdot e}_{z_0} + z$$

During the control stage, the difference $Z_m-z_e$ is servo-controlled to zero by the corrector 12 which prepares a command bs of value +1 or −1 depending on whether the pendulum is to be pushed or pulled, and as a result s=(bs+1)/2.

If bs=+1, then s is forced to 1 such that the switch 9 connects the output from the digital-to-analog converter 15 to the stationary electrode 5.1 and the stationary electrode 5.2 to ground. The voltage from the digital-to-analog converter 15 then passes from zero to a non-zero value and then returns to zero before the relaxation stage. The electrostatic force, which is attractive, then pulls the pendulum towards the stationary electrode 5.1

If bs=−1, then s is forced to 0, such that the switch 9 connects the output from the digital-to-analog converter 15 to the stationary electrode 5.2 and the stationary electrode 5.1 to ground. The voltage from the digital-to-analog converter 15 then passes from zero to a non-zero value and then returns to zero before the relaxation stage, while describing a variation over time that is identical to that described for the situation where bs=+1. The electrostatic force then pulls the pendulum towards the stationary electrode 5.2.

It should be observed, that in a manner analogous to detection, using a single digital-to-analog converter 15 once more guarantees that the voltages applied to the electrodes

5.1 and 5.2 are equal. This is particularly important during the control stage, since the electrostatic force applied to the pendulum is equal to the difference between the electrostatic forces applied to the electrodes 5.1 and 5.2. Since these forces are proportional to the squares of the applied voltages, it is necessary to ensure that the squares of said voltages are symmetrical, and unlike the detection situation, this symmetry must be obtained not only at the sampling instants, but also on average over the sampling period. The single and multiplexed digital-to-analog converter 15 serves to apply identical voltage profiles to the electrodes 5.1 and 5.2 independently of any fabrication defects in the electronics. The instants at which the selectors switch are not critical because they are switched only when the output voltage from the digital-to-analog converter 15 is zero.

The waveforms delivered by the digital-to-analog converter 15 during the two detection stages and during the control stage are characterized by their respective rms values $\sigma_d$ and $\sigma_s$ defined over the duration $T_s$:

$$\frac{1}{T_s} \cdot \int_{(n-1) \cdot T_s}^{n \cdot T_s} \sum \cdot dt = 2 \cdot \sigma_d^2 + \sigma_c^2$$

$$\frac{1}{T_s} \cdot \int_{(n-1) \cdot T_s}^{n \cdot T_s} \Delta \cdot dt = bs \cdot \sigma_c^2$$

with $\Sigma = V_h^2 + V_b^2$ and $\Delta = V_h^2 - V_b^2$.

The magnitudes $\Sigma$ and $\Delta$ are representative respectively of the action of the symmetrical forces and the action of the asymmetrical forces acting on the pendulum. The magnitudes $\Sigma$ and $\Delta$ are considered to be independent of the position z, which assumes that the electrodes are voltage-controlled and not load-controlled.

The equation for variation averaged over the sampling period then becomes (equation I):

$$\underbrace{\ddot{z}_m - \ddot{z}_0}_{\approx 0} = \frac{k_e - k}{m} \cdot (z_m - z_0) + \frac{k}{m} \cdot z_c + \underbrace{\frac{C_1 \cdot \sigma_c^2}{2 \cdot m \cdot e} \cdot (\varepsilon_1 \cdot \lambda + bs) - \gamma}_{\text{Electrostatic acceleration}}$$

With 
$$\begin{cases} k_e = \frac{C_2 \cdot \sigma_c^2}{e^2} \cdot (\lambda + \varepsilon_2 \cdot bs) \\ \lambda = 2 \cdot \frac{\sigma_d^2}{\sigma_c^2} + 1 \end{cases}$$

$k_e$ being the electrostatic stiffness;
k being the mechanical stiffness;
$z_c$ being the mechanical offset;
$z_0$ being the mechanical offset.

The expression for electrostatic force is thus linear relative to bs, and in addition the electrostatic stiffness is now constant, such that the estimated acceleration is calculated as an affine function of bs.

The above formula assumes that the second derivative of $z_m$ is sufficiently close to zero to be ignored, which means that the following condition needs to be satisfied:

$$|\ddot{z}_m| << \left| -\frac{k}{m} \cdot z_m \right|$$

In practice, this amounts to limiting the spectrum of $z_m$ to a frequency band situated well below the first resonant frequency of the sensing element.

In order to evaluate the errors due to the various defects and reveal ways of remedying them, the concepts of maximum acceleration and of abutment acceleration are introduced.

If the sensor and its implementation are free from defects, then the maximum acceleration $\gamma_{max}$ that it is possible to compensate is obtained by replacing bs by 1 in equation I, giving:

$$\gamma_{max} = \frac{C_1}{2 \cdot m \cdot e} \cdot \sigma_c^2 \rightarrow C_1 = \frac{2 \cdot m \cdot e}{\sigma_c^2} \cdot \gamma_{max}$$

The electrical permittivity of the gap between the electrodes, the density, the active area and the thickness of sensing element are written respectively $\epsilon$, $\rho$, S, and h. Once the pendulum material has been selected, it can be seen that $\gamma_{max}$ depends solely on the thickness of the pendulum and on the rms value of the electric field $\sigma_c/e$:

$$\left.\begin{matrix} C_1 \approx \varepsilon \cdot \frac{S}{e} \\ m \approx \rho \cdot S \cdot h \end{matrix}\right\} \rightarrow \gamma_{max} = \frac{\varepsilon}{2 \cdot \rho \cdot h} \cdot \left(\frac{\sigma_c}{e}\right)^2$$

Furthermore, the acceleration $\gamma_0$ that would bring an ideal pendulum into abutment in the absence of electrostatic force is given by:

$$\gamma_0 = \frac{k}{m} \cdot e \rightarrow \frac{k}{m} = \frac{\gamma_0}{e}$$

By substituting into equation I, there can be seen errors $\gamma_1$, $\gamma_2$, and $\gamma_3$:

$$\gamma_{max} \cdot bs =$$

$$\gamma - \left\{\underbrace{\left[2 \cdot \frac{C_2}{C_1} \cdot (\lambda + \varepsilon_2 \cdot bs) \cdot \gamma_{max} - \gamma_0\right] \cdot \frac{z_m - z_0}{e}}_{\gamma_1} + \underbrace{\gamma_0 \cdot \frac{z_c}{e}}_{\gamma_2} + \underbrace{\lambda \cdot \gamma_{max} \cdot \varepsilon_1}_{\gamma_3}\right\} \rightarrow$$

$$\underbrace{\phantom{XXXXXXXXXXXXXXXXXXXXXXXXXXXXXXXXX}}_{\gamma_b}$$

$$bs = \frac{\gamma - \gamma_b}{\gamma_{max}}$$

$$k_e = 2 \cdot \frac{C_2}{C_1} \cdot \frac{m}{e} \cdot (\lambda + \varepsilon_2 \cdot bs) \cdot \gamma_{max}$$

The biases $\gamma_1$, $\gamma_2$, and $\gamma_3$ depend respectively on the electrical detection offset, on the stresses exerted by the hinge, and on the asymmetries of the electrostatic force. For $\gamma_1$, the fraction proportional to $bs \cdot \gamma_{max}$ constitutes a scale factor error of the accelerometer. Nevertheless, this error is generally negligible since it typically has the value:

$$2 \cdot \underbrace{\frac{C_2}{C_1}}_{\approx 1} \cdot \underbrace{\varepsilon_2}_{<10^{-3}} \cdot \underbrace{\frac{z_m - z_0}{e}}_{<10^{-3}} < 2 \, ppm$$

When $z_m$ is zero, the bias component due to detection is obtained by replacing $z_0$ by its value:

$$\gamma_1(z_m=0) = -\left[2 \cdot \frac{C_2}{C_1} \cdot (\lambda + \varepsilon_2 \cdot bs) \cdot \gamma_{max} - \gamma_0\right] \cdot \varepsilon_0 \cdot \frac{C_0}{C_1}$$

Generally, the scale factor $\gamma_{max}$ and the bias $\gamma_b$ are previously identified in the factory in a calibration step performed over a temperature range corresponding to the utilization temperature range of the accelerometer. Calibration parameters that differ from real parameters because of modeling errors or because of aging are written using a circumflex accent, so the estimated acceleration written $\gamma_e$ is then calculated using the formula:

$$\gamma_e = \hat{\gamma}_b + \hat{\gamma}_{max} \cdot bs$$

Knowing the expression for bs as a function of $\gamma$, the relative scale factor error $\varepsilon_{max}$ is introduced:

$$\gamma_e = \hat{\gamma}_b + \frac{\hat{\gamma}_{max}}{\underbrace{\frac{\gamma_{max}}{1+\varepsilon_{max}}}} \cdot (\gamma - \gamma_b) = \hat{\gamma}_b + (1 + \varepsilon_{max}) \cdot (\gamma - \gamma_b)$$

In order to be unaffected by the error due to $\gamma_1$, it is possible to compensate the electrical stiffness by the mechanical stiffness so that their difference cancels, thereby canceling the sensitivity of the bias to $z_0$:

$$\gamma_1 = \underbrace{\frac{k_e - k}{m}}_{0} \cdot (z_m - z_0) = \underbrace{\left[2 \cdot \frac{C_2}{C_1} \cdot (\lambda + \varepsilon_2 \cdot bs) \cdot \gamma_{max} - \gamma_0\right]}_{0} \cdot \frac{z_m - z_0}{e}$$

Nevertheless, because of dispersion in the fabrication of the sensor and of the electronics, the difference between the stiffnesses is canceled only imperfectly, thereby reducing the benefit of the operation. Furthermore, if the stiffness difference were to be canceled accurately at any given operating temperature, that would not apply to other operating temperatures, since the temperature sensitivities of the sensor and of the its electronics are not the same.

The method of the invention enables the difference between the mechanical and electrostatic stiffnesses to be servo-controlled on zero, thereby canceling the effect of detection bias.

To do this, $z_m$ is modulated by the control circuit using a time profile that is predetermined but not necessarily cyclical.

Since the reaction of $\gamma_e$ to this disturbance written $\Delta\gamma_e$ is proportional to the difference of stiffnesses, this reaction can be canceled merely by adjusting $k_e$, i.e. $\lambda$. Depending on whether the disturbance is periodic or not, the reaction of $\gamma_e$ to $z_m$ can be estimated by synchronous demodulation and filtering by least squares or by a Kalman filter:

$$\Delta\gamma_e = \underbrace{\Delta\hat{\gamma}_b}_{0} + \underbrace{\Delta\varepsilon_{max}}_{0} \cdot (\gamma - \gamma_b) + (1 + \varepsilon_{max}) \cdot \left(\underbrace{\Delta\gamma}_{0} - \Delta\gamma_b\right) = 0 \to \Delta\gamma_b = 0$$

$$\to \left[2 \cdot \frac{C_2}{C_1} \cdot (\lambda + \varepsilon_2 \cdot bs) \cdot \gamma_{max} - \gamma_0\right] \cdot \frac{z_m}{e} = 0$$

$$\to \gamma_b = \underbrace{\gamma_0 \cdot \frac{z_c}{e}}_{\gamma_2} + \underbrace{\lambda \cdot \gamma_{max} \cdot \varepsilon_1}_{\gamma_3}$$

The adjustment of $\lambda$ (see equation I) is obtained by setting $\sigma_d$, thereby leaving $\varepsilon_{max}$ invariant. The adjustment of $\sigma_d$ can be obtained by acting on the form or the duration of the voltage v during the detection stages. The second solution is preferred since it leaves the detection gain invariant.

Since the reaction of $\gamma_e$ to $z_m$ is canceled by canceling the difference of stiffnesses $k_e-k$, the reaction of $\gamma_e$ to $z_0$ is also canceled, and this source of bias is eradicated.

Balancing the stiffnesses nevertheless presents a limitation of principle. Since the maximum acceleration selected is generally imposed, the balance condition then leads to selecting as follows:

$$\gamma_0 = 2 \cdot \frac{C_2}{C_1} \cdot \lambda \cdot \gamma_{max} \to \gamma_b = \lambda \cdot \gamma_{max} \cdot \left(2 \cdot \frac{C_2}{C_1} \cdot \frac{z_c}{e} + \varepsilon_1\right)$$

This means that the electrical stiffness that is proportional to $\gamma_{max}$ imposes a mechanical stiffness, itself proportional to the maximum acceleration to be compensated. This solution is perfectly well adapted for sensors that have gaps that are large enough to reduce the effect of the deformations that are responsible for $z_c$. This solution is also advantageous when it is applied to a sensor having electrodes of variable area for which the electrostatic stiffness is naturally close to zero.

The option of using a low mechanical stiffness in order to reduce the bias due thereto generally means that it is necessary to manage without matching stiffnesses. Under such circumstances, the modulation initially applied to $z_m$ is not used, but $z_m$ is adjusted in order to compensate $z_0$ such that:

$$\gamma_1 = \underbrace{\frac{k_e - k}{m} \cdot (z_m - z_0)}_{0}$$

This is obtained by modulating $k_e$, or more exactly $\lambda$, using a time profile that is known, but not necessarily reproducible.

Since the reaction of $\gamma_e$ to this disturbance is substantially proportional to $z_m-z_0$, it is possible in principle to cancel this reaction by adjusting $z_m$. Depending on whether the disturbance is periodic or not, the reaction of $\gamma_e$ to $k_e$ can be estimated by synchronous demodulation and filtering by least squares or by Kalman filtering:

$$\Delta\gamma_b = \left(2 \cdot \frac{C_2}{C_1} \cdot \frac{z_m - z_0}{e} + \varepsilon_1\right) \cdot \Delta\lambda \cdot \gamma_{max} = 0 \to \frac{z_m - z_0}{e} = -\frac{C_1}{2 \cdot C_2} \cdot \varepsilon_1$$

$$\to \gamma_b = -\varepsilon_1 \cdot \varepsilon_2 \cdot bs \cdot \gamma_{max} + \left(\frac{C_1}{2 \cdot C_2} \cdot \varepsilon_1 + \frac{z_c}{e}\right) \cdot \gamma_0$$

As indicated by the above equation, instead of being canceled, the quantity $z_m-z_0$ is adjusted as a function of $\varepsilon_1$.

$\lambda$ is modulated by setting $\sigma_d$, thereby leaving $\varepsilon_{max}$ invariant. $\sigma_d$ can be adjusted by acting on the form or the duration of the voltage v during the detection stages. The second solution is preferred since it leaves the detection gain invariant.

It should be observed that servo-controlling the offset penalizes sensors having electrodes of variable area since the naturally large $C_1/C_2$ ratio degrades the bias.

In the second embodiment of FIGS. 2 and 3, the exciter circuit 6 does not have a digital-to-analog converter 15 and instead has a voltage generator 30 connected via a selector 31 to an input of an amplifier stage including an input resistor 32 connected to an amplifier 33 looped via a filter capacitor 34 and a resistor 35.

This makes it possible to reduce cost and the power dissipated by the exciter circuit by eliminating the digital-to-analog converter.

The command u being set to 0 or to 1 controls the selector 31. This selector connects the resistor 32 either to the constant voltage generator 30 of reference Ref, or to ground. The voltage applied to the resistor 32 is amplified by the ratio of the resistances of the resistors 32 and 35 (i.e. $-R_2/R_1$) and is filtered with a time constant $R_2C$ (where C is the capacitance of the capacitor 34), thereby preventing transient saturation of the load amplifier 33 associated with exceeding its slew rate. This time constant must nevertheless be selected to be sufficiently small compared with $T_s$ for the output voltage from the load amplifier 33 to return to a value close to zero when switching from $I_2$ to $I_2$.

In order to reduce the impact of the quantization of the analog-to-digital converter on noise in the estimated acceleration, the circuit of FIG. 3 can be used.

The main amplifier stage 16 of the detector circuit 7 is connected to an analog-to-digital converter 19 via a compensator stage, given overall reference 40, having a first resistor 41 and a second resistor 42 connected in series between the output from the main amplifier stage 16 and the input of the analog-to-digital converter 19. The compensator stage 40 has an additional amplifier 43 and a selector 44 both connected in parallel with the second resistor 42, and a digital-to-analog converter 45 connected via a third resistor 46 to the second resistor 42, to the additional amplifier 43, and to the selector 44. The selector 44 and the digital-to-analog converter 45 are controlled by the control circuit 8.

This makes it possible to reduce low frequency noise that results from quantization by the analog-to-digital converter 19.

The gain $R_2/R_2$ that takes the place of a zoom in the compensation stage is set at a value that is much greater than unity. The selector 44 is open during the stages $D_1$ and $D_2$ when the output from the load amplifier 43 is stable. The digital-to-analog converter 45 is controlled by the control circuit 8 so as to keep the sum $y_1+y_2$ close to zero, the dynamic range of the digital-to-analog converter possibly being used to code only the variations in the capacitance as amplified by the ratio $R_2/R_2$.

The digital-to-analog converter 45 compensates the effects of:
 the constant portion of the capacitances;
 the offset $v_{os}$;
 the injected charge $Q_{os}$.

These effects vary slowly, thereby enabling a slow digital-to-analog converter 45 to be used with low noise level, thereby simultaneously reducing cost and reducing power dissipation.

In the vicinity of the cut-off frequency of the sigma delta loop, the open loop transfer function must tend towards that of an integrator in order to provide good damping. However, since the behavior of the pendulum is dominated at high frequency by inertial forces, the transfer function z/bs can be approximated by that of a double integrator. The transfer function of the corrector must therefore tend towards that of a differentiator.

When using a zoom, the electrical saturation of detection precedes the mechanical saturation associated with the pendulum coming into abutment. When electrical saturation is reached, the differentiation function normally performed by the corrector can no longer be performed and the loop may enter into a limit cycle of outcome that can not generally be guaranteed.

In order to work around this difficulty, it is desirable for the analog-to-digital converter 19 to be capable, when necessary, of measuring not only the output from the zoom, but also its input. This merely requires using a 2-to-1 multiplexer and an appropriate control strategy.

In a particular configuration of the sensor in the first or second embodiment, the sensor has two electrostatic pendular accelerometers, each having a respective exciter circuit and detector circuit, and sharing a common sensing axis.

The two methods for canceling the offset effect in detection are based on making use of the reaction $\gamma_e$ to a known disturbance. If the acceleration applied to the sensor presents apparent correlation with the modulation signal, that leads to correction of the estimated acceleration that is partially erroneous. The use of a Kalman filter can reduce sensitivity to this type of error, but cannot eliminate it.

For example, if the accelerometer is subjected to acceleration white noise having an rms value of 10 $g_{rms}$ over a frequency band extending from 0 to 10 kilohertz (kHz), and if the servo-control loop of $\Delta\gamma$ is regulated with a passband of 0.01 Hz, this will lead to a compensation error of 10 $mg_{rms}$, which is not acceptable in certain applications such as navigation.

It is possible to work around this difficulty by using two accelerometers that are identical to that described above with sensing axes that coincide. It then suffices to apply the modulation of $z_m$ or of $\lambda$ to only one of those two accelerometers and to servo-control the reaction to the $\Delta\gamma$ difference on zero. Under such circumstances, the effect of the applied acceleration is canceled, ignoring gain asymmetries and axis setting of the two accelerometers.

Since the gain of the two accelerometers is calibrated, the gain difference is less than 100 parts per million (ppm), which represents an error lying in the range 10 $mg_{rms}$ to 1 $\mu g_{rms}$. Nevertheless, the applied acceleration is still manifested via the raw axis setting differences that are less than 10 milliradians (mrad). This limitation nevertheless provides a reduction by 100 of the initial defect, which passes from 10 $mg_{rms}$ to 100 $\mu g_{rms}$, a value which is acceptable for a high performance navigation system.

The modulation may advantageously be applied to one and then to the other of the two accelerometers so as to obtain information that is both redundant and accurate. More generally, it suffices to use mutually decorrelated modulation signals for the two accelerometers. A composite accelerometer of that kind is referred to as a "double" accelerometer.

If the limitations associated with axis setting are deemed to be unacceptable, it is possible to reduce their influence even further by combining the estimates and the modulations of three double accelerometers having sensing axes that are in independent directions, and preferably mutually orthogonal.

The defect associated with raw axis setting differences is then reduced to the modeling residue and to the aging thereof as a result of factory calibration that enables the following compensation matrix to be identified:

$$\vec{\gamma}_{e,cor} = M \cdot \vec{\gamma}_e$$

The vector $\vec{\gamma}_e$ is a 6×1 vector constituted by the six values from the six accelerometers, the matrix M is a 6×6 matrix that corrects the gain and axis setting errors of the six accelerometers. The vector $\vec{\gamma}_{e,cor}$ is a 6×1 vector made up of the six corrected acceleration values that are redundant in pairs.

Using $\vec{\gamma}_{e,cor}$ in association with six mutually decorrelated modulations makes it possible to reduce the weights of gain and axis setting errors to less than 100 ppm, thereby reducing the residual defect to less than 1 $\mu g_{rms}$.

Naturally, the invention is not limited to the embodiments described, but covers any variant coming within the ambit of the invention as defined by the claims.

In particular, the electronics of the sensor may have a structure other than those described. For example, the exciter circuit of the first embodiment may be used with the detector circuit of the second embodiment and the detector circuit of the first embodiment may be used with the exciter circuit of the second embodiment.

In addition, the invention is applicable to any type of electrostatic pendular accelerometer. Thus, the mechanics of the sensor may be of a structure that is different from that described. For example, the seismic mass may be connected to the housing via some other number of hinges arranged so as to enable the seismic mass to pivot or to slide relative to the housing.

When the sensor has two electrostatic pendular accelerometers, it is possible to provide a single exciter circuit for both accelerometers.

It should be observed that it may be advantageous to invert the order of the detection stages $D_1$ and $D_2$ on each sampling period, in order to make the measurements performed on each pair of electrodes symmetrical.

The invention claimed is:

1. A method of controlling a sensor comprising at least one electrostatic pendular accelerometer having stationary first and second electrodes that are secured to a housing and that are connected to an exciter circuit, and a third electrode that is carried by a pendulum connected to the housing so as to be movable and that is connected to a detector circuit, the method comprising the steps of:
   during two successive detection stages, exciting in alternation first one and then the other of the stationary electrodes by detection pulses in order to detect a first capacitance and a second capacitance between the movable electrode and the respective stationary electrodes;
   estimating a position of the pendulum from the detected capacitances;
   determining a servo-control error corresponding to a difference between the estimated position and a setpoint position;
   on the basis of the servo-control error, determining a command specifying whether the next detection pulse is to push or to pull the pendulum;
   calculating an acceleration that is to be measured as a function of the setpoint position and of the determined command; and
   during a control stage, exciting one or the other of the stationary electrodes by control pulses for servo-controlling the servo-control error to zero.

2. A method according to claim 1, wherein the setpoint position is modulated with a time profile that is determined in such a manner that a reaction to the determined command is proportional to a difference between an electrostatic stiffness and a mechanical stiffness between the pendulum and the housing.

3. A method according to claim 2, wherein the reaction to the command to said modulation is canceled by adjusting a form or a duration of the detection pulses so that the electrostatic stiffness compensates the mechanical stiffness.

4. A method according to claim 1, wherein the setpoint position is adjusted to compensate a position estimation bias.

5. A method according to claim 1, wherein the steps are repeated in periods, the stages of detecting the first and second capacitances being interchanged from one period to another.

6. A method according to claim 1, wherein the steps are separated by relaxation stages during which a switch is positioned so that a voltage of the exciter circuit is zero.

7. An accelerometer sensor for performing the method according to claim 1, the sensor comprising at least one electrostatic pendular accelerometer having stationary first and second electrodes that are fastened to a housing and that are connected to an exciter circuit, and a third electrode that is carried by a pendulum connected to the housing so as to be movable and that is connected to a detector circuit, the sensor being characterized in that the exciter circuit has an output connected to a switch connected to the first and second electrodes, the switch having a first connection position and a second connection position for selectively connecting the first electrode or the second electrode to the exciter circuit, and in that the exciter circuit, the switch, and the detector circuit are connected to a control circuit arranged so that the first and second electrodes are excited by pulse trains in such a manner as to keep the pendulum in a setpoint position and in such a manner as to determine an acceleration to which the pendulum is subjected.

8. A sensor according to claim 7, wherein the exciter circuit includes a digital-to-analog converter connected to the switch and controlled by the control circuit.

9. A sensor according to claim 7, wherein the exciter circuit includes a constant voltage generator connected via a selector to an input of an amplifier/filter stage having an output forming the output of the exciter circuit.

10. A sensor according to claim 7, wherein the detector circuit has a main amplifier stage with an input connected to the third electrode and an output connected to an input of a single analog-to-digital converter having an output connected to the control unit.

11. A sensor according to claim 10, wherein the main amplifier stage is connected to the analog-to-digital converter via a compensator stage having a first resistor and a second resistor connected in series between the output of the main amplifier stage and the input of the analog-to-digital converter, the compensator stage having an additional amplifier and a selector both connected in parallel with the second resistor, and a digital-to-analog converter connected to the second resistor, to the additional amplifier, and to the selector, the selector and the additional amplifier being connected to the control circuit.

12. A sensor according to claim 7, wherein the control circuit is arranged to change the position of the switch when an output voltage from the exciter circuit is zero.

13. A sensor according to claim 7, wherein the control circuit has a first estimator for estimating the position of the pendulum, the first estimator having an input connected to the detector circuit and an output connected to a negative input of a summing circuit having an output connected to an input of a corrector having an output connected to a sequencer and to a second estimator having an output connected to an additive input of the summing circuit, and a first output supplying an estimate of the acceleration and a second output connected to a positive input of the summing circuit to supply the summing circuit with a modulated position, the corrector being arranged to determine a pulse and the sequencer being arranged to control the exciter circuit, the switch, and the detector circuit.

14. A sensor according to claim 7, having at least two electrostatic pendular accelerometers each provided with a respective exciter circuit and detector circuit, and that share a substantially common axis.

* * * * *